UNITED STATES PATENT OFFICE.

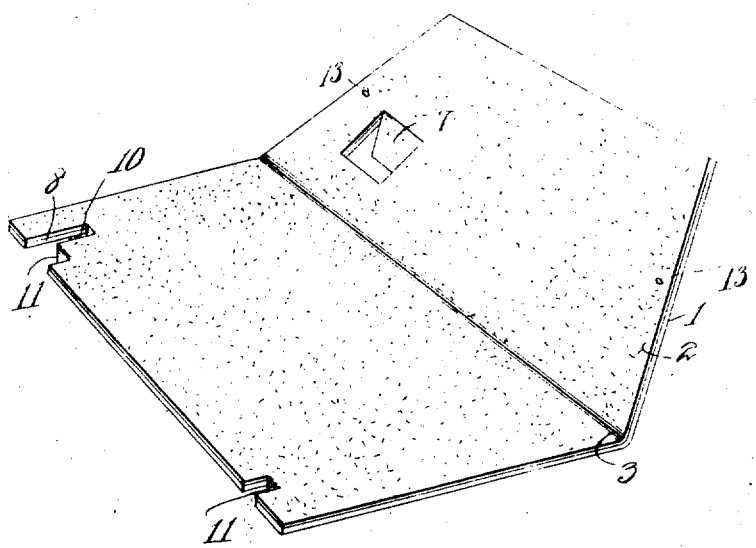
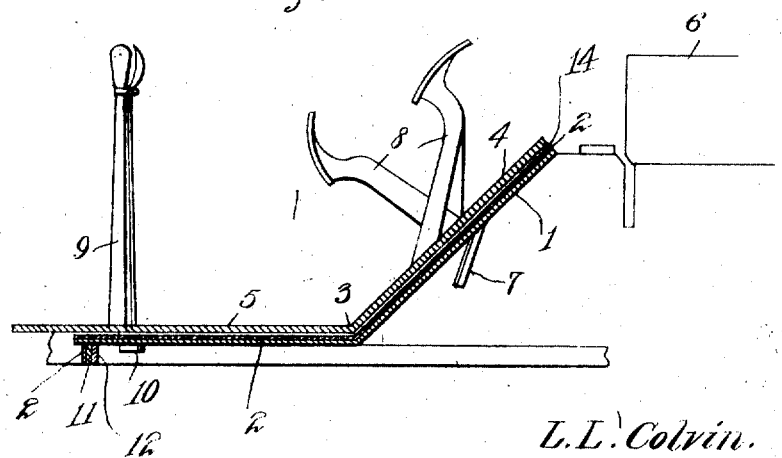

LAWRENCE L. COLVIN, OF LOUISVILLE, KENTUCKY.

AUTOMOBILE-SHIELD.

1,251,865.   Specification of Letters Patent.   Patented Jan. 1, 1918.

Application filed September 5, 1917.  Serial No. 189,813.

*To all whom it may concern:*

Be it known that I, LAWRENCE L. COLVIN, a citizen of the United States, residing at Louisville, in the county of Jefferson and State of Kentucky, have invented a new and useful Automobile-Shield, of which the following is a specification.

The subject of this invention is a shield for automobiles, and the objects of the invention are, first, to provide a shield which will protect the foot board from the heat of the engine, second, to provide a shield which will prevent hot air rising through the apertures formed for the operative levers, third, to provide a shield which may be easily attached to and removed from an automobile, fourth, to provide a simple and efficient automobile shield.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

One practical embodiment of the invention is shown in the accompanying drawing, wherein:

Figure 1 is a perspective view of a shield constructed in accordance with the invention.

Fig. 2 is a central vertical sectional view of the same in place on an automobile, a fragment of which is shown.

Referring to the drawings by numerals of reference:

The shield is formed of a sheet of metal 1 or like suitable material to which may be secured, by suitable adhesive or otherwise, a sheet of heat insulating material 2, such as asbestos.

The sheet is bent, as indicated at 3, to conform to the inclination of the foot board 4 with respect to the bottom 5. As will be seen most clearly in Fig. 2, this interposes the sloping surface of the shield between the engine 6 and the foot board.

The shield has a tongue 7 struck out therefrom, forming an opening for the reception of the foot levers 8. The outwardly bent tongue, as will be seen most clearly in Fig. 2, acts to direct the hot air away from the opening and, in so doing, creates a down draft through the opening.

A slot 8 is formed in the shield and opens at the rear edge thereof, and receives the hand lever 9. A curved flange 10 depends from the shield and embraces the inner end of the slot 8, and acts as a deflector to prevent hot air rising through the slot 8.

Tongues 11 are cut from the rear edge of the plate and turned down and rest against the frame 12 of the automobile. Apertures 13 may be provided in the shield, if necessary, for the reception of screws or the like by which the shield may be held in position on the automobile.

An air space 14 is preferably left between the floor or foot board and the plate to more thoroughly insulate the foot board from the heat of the engine.

Having thus described the invention, what is claimed as new and sought by Letters Patent, is:

An automobile shield, comprising a heat insulating plate adapted to underlie the foot board and contiguous portions of the bottom of an automobile body, said plate provided with apertures for the reception of the operative levers, and deflecting members depending from the plate adjacent the apertures.

In testimony that I claim the foregoing as my own, I have hereto affixed my signature in the presence of two witnesses.

LAWRENCE L. COLVIN.

Witnesses:
  LEWIS P. BLACKBURN,
  J. M. NICHOLSON.